(12) United States Patent
Kotyk

(10) Patent No.: US 7,513,393 B2
(45) Date of Patent: Apr. 7, 2009

(54) CONTAINER SYSTEM

(75) Inventor: Jeffrey M. Kotyk, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 139 days.

(21) Appl. No.: 11/424,578

(22) Filed: Jun. 16, 2006

(65) Prior Publication Data

US 2007/0289994 A1  Dec. 20, 2007

(51) Int. Cl.
*B67D 5/42* (2006.01)

(52) U.S. Cl. ............................. 222/386; 222/51; 417/40

(58) Field of Classification Search ................ 222/386, 222/141, 256, 51, 41, 62, 67–69, 265; 220/217–227; 440/88 P, 881; 137/41, 122, 165, 192; 417/40
See application file for complete search history.

(56) References Cited

U.S. PATENT DOCUMENTS

| | | | | |
|---|---|---|---|---|
| 2,221,763 A | * | 11/1940 | Ginter ........................ 222/261 |
| 3,113,282 A | * | 12/1963 | Coleman ..................... 338/33 |
| 3,427,771 A | * | 4/1969 | Nusbaum .................. 200/84 C |
| 3,474,931 A | * | 10/1969 | Creith et al. ................ 220/219 |
| 3,601,285 A | * | 8/1971 | Leger et al. ................. 222/250 |
| 3,646,293 A | * | 2/1972 | Howard ..................... 200/84 C |
| 3,678,750 A | * | 7/1972 | DiNoia et al. ................. 73/313 |
| 3,862,701 A | * | 1/1975 | Strunc et al. ................. 220/227 |
| 4,186,419 A | * | 1/1980 | Sims .......................... 361/178 |
| 4,243,151 A | * | 1/1981 | Bruening .................... 220/216 |
| 4,384,184 A | * | 5/1983 | Alvarez ..................... 200/84 C |
| 4,702,107 A | * | 10/1987 | Guerrini et al. ............... 73/319 |
| 5,025,827 A | * | 6/1991 | Weng ......................... 137/392 |
| 5,149,287 A | * | 9/1992 | Koike ....................... 440/88 L |
| 5,560,509 A | * | 10/1996 | Laverman et al. ........... 220/217 |

OTHER PUBLICATIONS

Drawing of a prior art level indicating system.
ELOBAU, General Programme catalog, front cover, pp. 10 and 11, back cover, dated Jul. 2003.
ELOBAU, Vehicle Components catalog, front cover, pp. 24-27, back cover, dated Mar. 2003.

\* cited by examiner

*Primary Examiner*—Lien T Ngo
(74) *Attorney, Agent, or Firm*—Senniger Powers LLP

(57) ABSTRACT

A container system of this invention includes a container for holding a fluid, a follower in the container which moves in the container in response to a change in a level of fluid in the container, and a sensor assembly for sensing the level of fluid in the container. The sensor assembly is especially (albeit not exclusively) suited for viscous fluids.

27 Claims, 11 Drawing Sheets

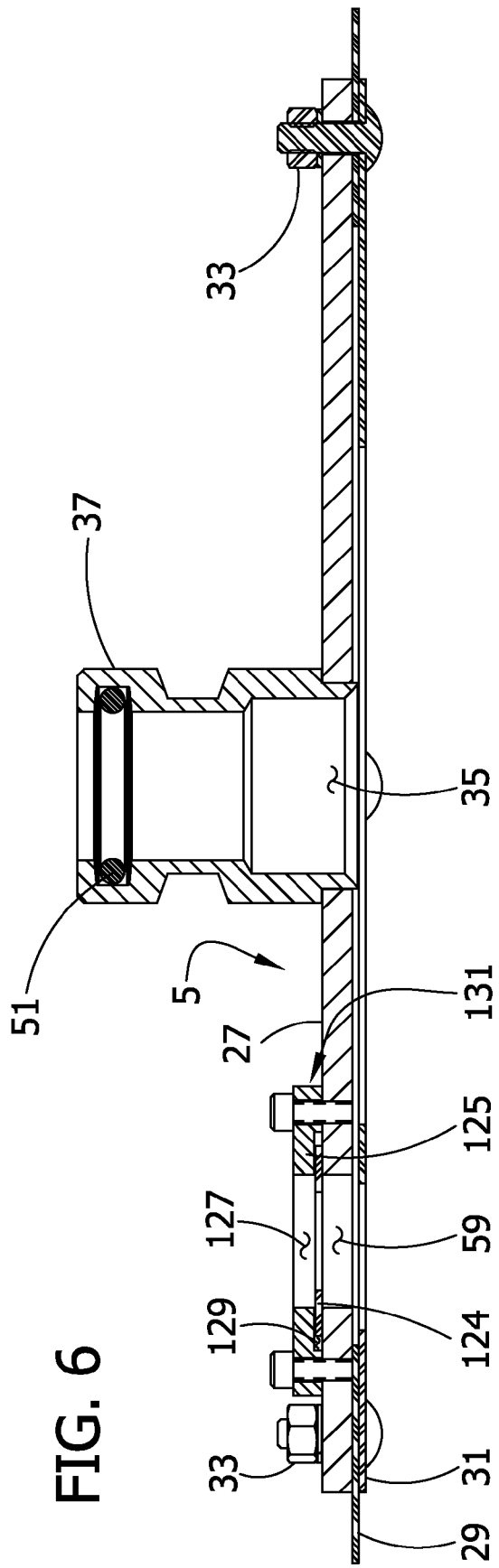

CONTAINER SYSTEM

BACKGROUND OF THE INVENTION

This invention relates generally to container systems, and more particularly to a container system used in the delivery of viscous fluids, such as lubricants.

The proper lubrication of mechanical systems requires the delivery of a suitable lubricant (e.g., grease) at regular intervals to various points of lubrication. A typical source of lubricant is a container system comprising a container filled with grease, and a follower in the container above the grease which moves up and down as the level of grease in the container rises and falls. Lubricant is pumped under pressure from the container to locations where the lubrication is needed.

Conventional systems have not been provided with suitable means for monitoring the level of grease in a container. By way of example, one such system uses a switch mounted on the lid of the container, a mass which rests on the follower in the container, and a flexible line connecting the mass to the switch. The length of the flexible line is such that when the follower descends to a level indicating that the container is substantially empty, the weight of the mass transfers from the follower to the flexible line and actuates the switch to indicate that the container needs to be refilled. However, until the switch is activated, there is no means for determining the level of fluid in the container, short of removing the lid. Further, when the container is refilled, there is no convenient means for determining when the container is full except by overflow of lubricant from the container, or by other means which are not convenient. In one prior art system, a mass is attached to the container lid by a flexible line to suspend the mass at a location inside the container corresponding to the desired maximum fill level. When the follower rises to the maximum fill level, it lifts the mass which activates a switch to stop the pump.

There is a need, therefore, for a system capable of sensing the level of viscous fluid (e.g., grease) in such containers not only when the fluid level is low but also at other levels so that the amount of fluid remaining in the container can be monitored on a continuous basis after the container is filled.

SUMMARY OF THE INVENTION

In one embodiment, the present invention is directed to a container system comprising a container for holding a fluid, a follower in the container adapted to move up and down in the container in response to a change in a level of fluid in the container, and a sensor assembly for sensing the level of fluid in the container. The sensor assembly comprises a guide adapted to be attached to a lid of the container and to extend down into the container through a guide opening in the follower, a first device movable up and down on the guide in response to movement of the follower, and a second device secured in fixed position adjacent the guide. The first and second devices cooperate on movement of the first device past the second device to signal a level of fluid in the container. A limit device on the follower limits separation of the first device away from the follower when the follower moves in the container.

In another embodiment, the present invention is directed to a level sensor assembly for a container adapted to hold a fluid therein. The sensor assembly comprises a follower adapted to be placed in the container for movement in the container in response to a change of fluid level, and a guide adapted to be attached to a lid of the container and to extend into the container through an opening in the follower. The assembly also includes a first device adapted to move on the guide in response to movement of the follower, and a second device adapted to be secured in fixed position adjacent the guide. The first and second devices are adapted to cooperate on movement of the first device past the second device to signal a level of fluid in the container. A limit device is adapted to be attached to the follower for limiting separation of the first device away from the follower when the follower moves in the container.

In another embodiment, the present invention is directed to a lubricant container system comprising a container for holding a viscous lubricant, and a follower in the container adapted to move up and down in the container in response to a change in a level of lubricant in the container. A device is operable to send a signal in response to the lubricant in the container rising to a predetermined level during refilling of the container.

In another embodiment, a container system of this invention comprises a container for holding a viscous fluid, and a follower in the container adapted to move up and down in the container in response to a change in a level of fluid in the container. A first vertical member in the container extends through a first opening in the follower. The system includes a first seal assembly comprising a seal surrounding the first vertical member for sealing the first opening in the follower. The seal is movable in a generally horizontal plane relative to the follower plate to prevent binding of the first vertical member in the first opening as the follower moves in the container.

Other features will be in part apparent and in part pointed out in the following description.

BRIEF DESCRIPTION OF THE DRAWINGS

FIG. 6 is a section taken in the planes of lines 6-6 of FIG. 4;

Corresponding parts are indicated by corresponding numbers throughout the drawings.

DETAILED DESCRIPTION

Figure 1:
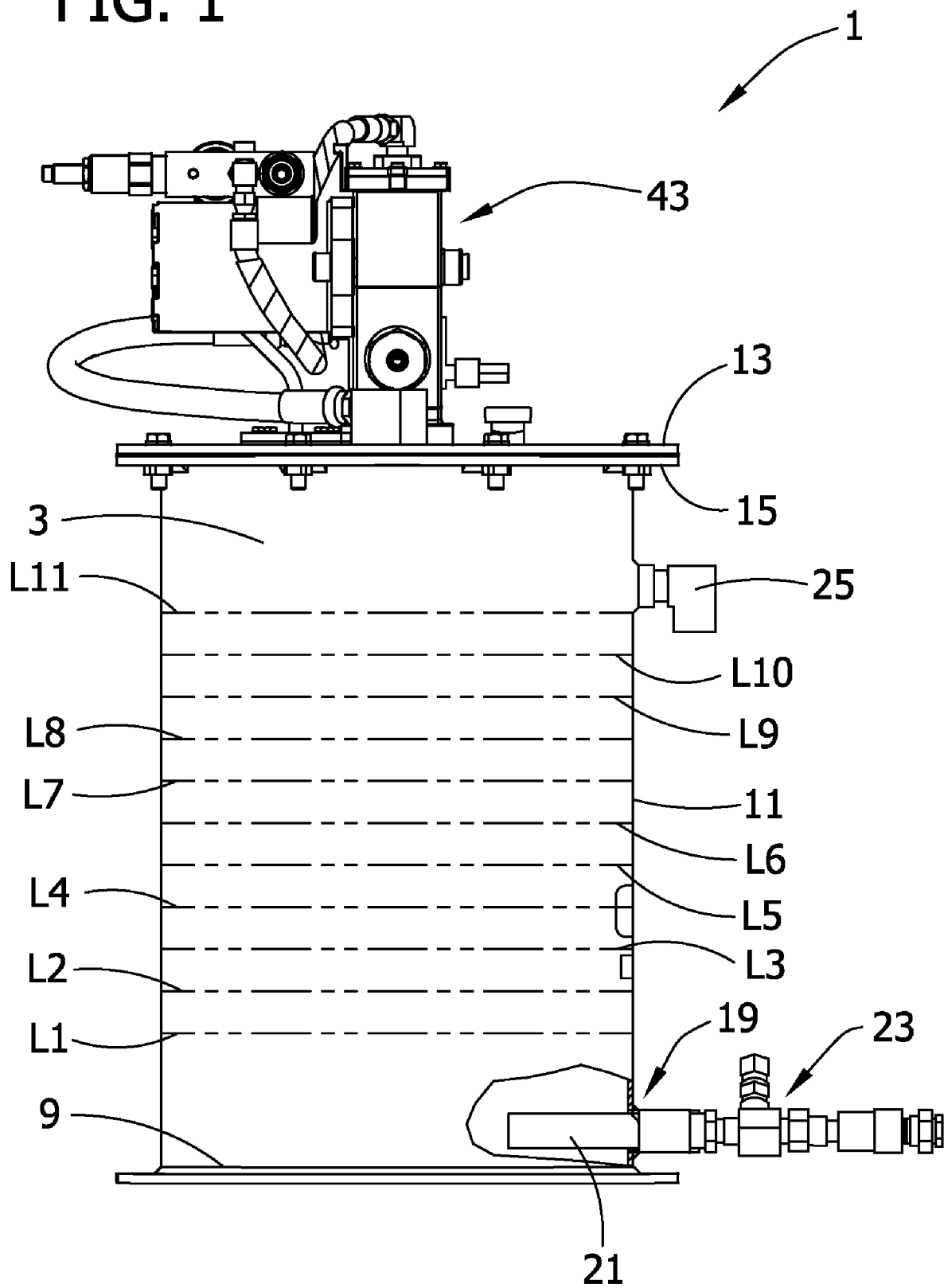
FIG. 1 is a side elevation of one embodiment of a container system of the present invention, with parts broken away to show details.
Figure 3:
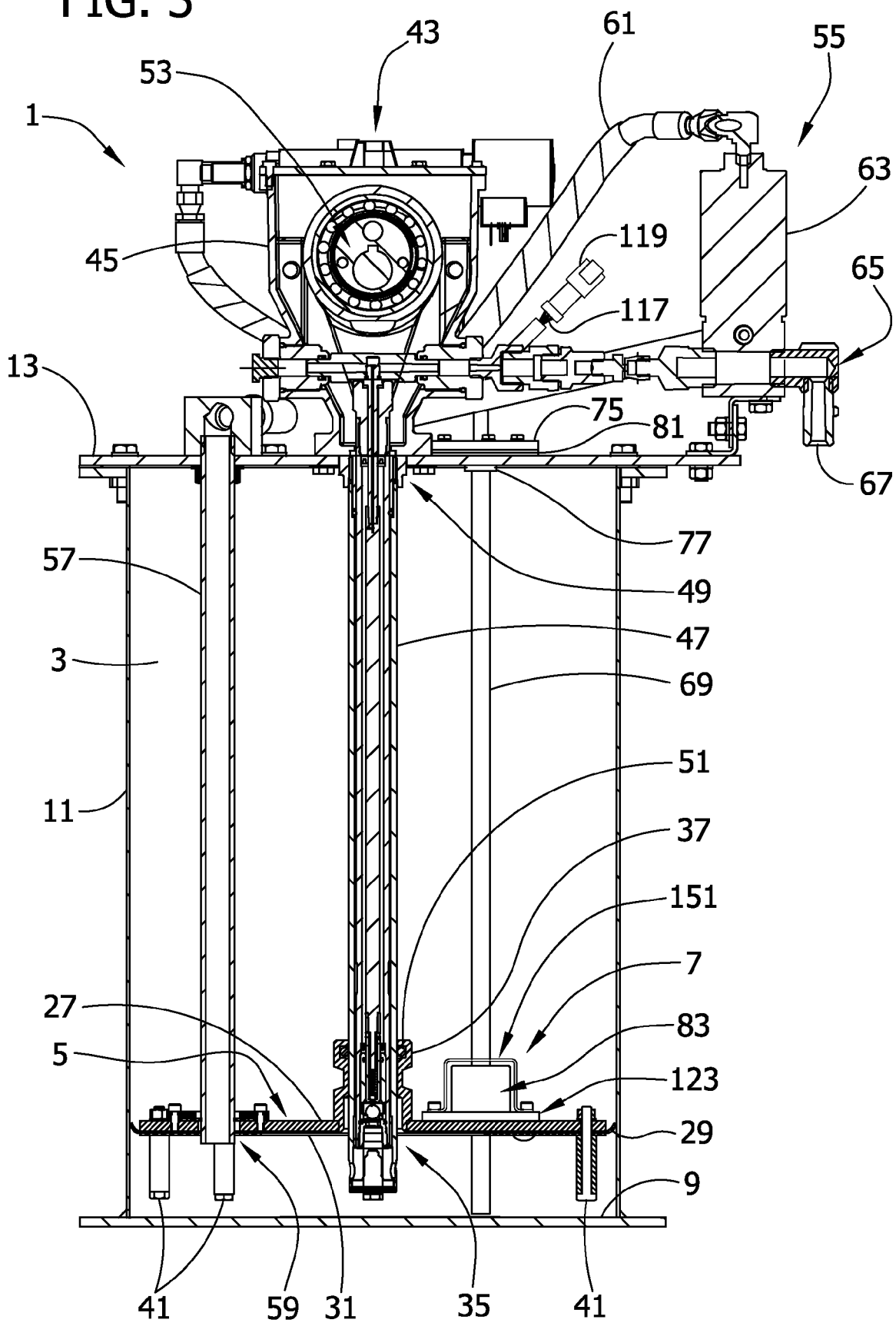
FIG. 3 is a vertical section taken in the plane of lines 3-3 of FIG. 2.

Referring now to the drawings, and first more particularly to FIG. 1, one embodiment of a container system 1 of the present invention is indicated in its entirety by the reference number 1. As illustrated in FIG. 3, the system 1 comprises a container 3 for holding a supply of viscous fluid, e.g., a viscous lubricant such as grease, and a follower, generally indicated at 5, positioned inside the container 3 above the lubricant. As will be understood by those skilled in this industry, the follower 5 rests on the lubricant and rises and falls inside the container as the level of lubricant changes. The container system 1 also includes a sensor assembly, generally designated 7, for sensing and signaling the level of fluid in the container. These components are described in more detail below.

Referring to FIG. 1, the container 3, sometimes referred to as a bucket, has a bottom 9, a side wall 11, and a top comprising a removable lid 13 fastened to a flange 15 around the rim of the side wall 11. The container 3 can be of any size and shape (e.g., cylindrical). The container 3 has an inlet 19 adjacent its lower end for refilling the container 3. The inlet 19 comprises an inlet pipe 21 extending into the container 3 and suitable valving 23 for controlling flow into the container 3. The container also has an overflow pipe 25 or outlet adjacent its upper end through which fluid is adapted to flow to prevent overfilling of the container 3.

Figure 4:
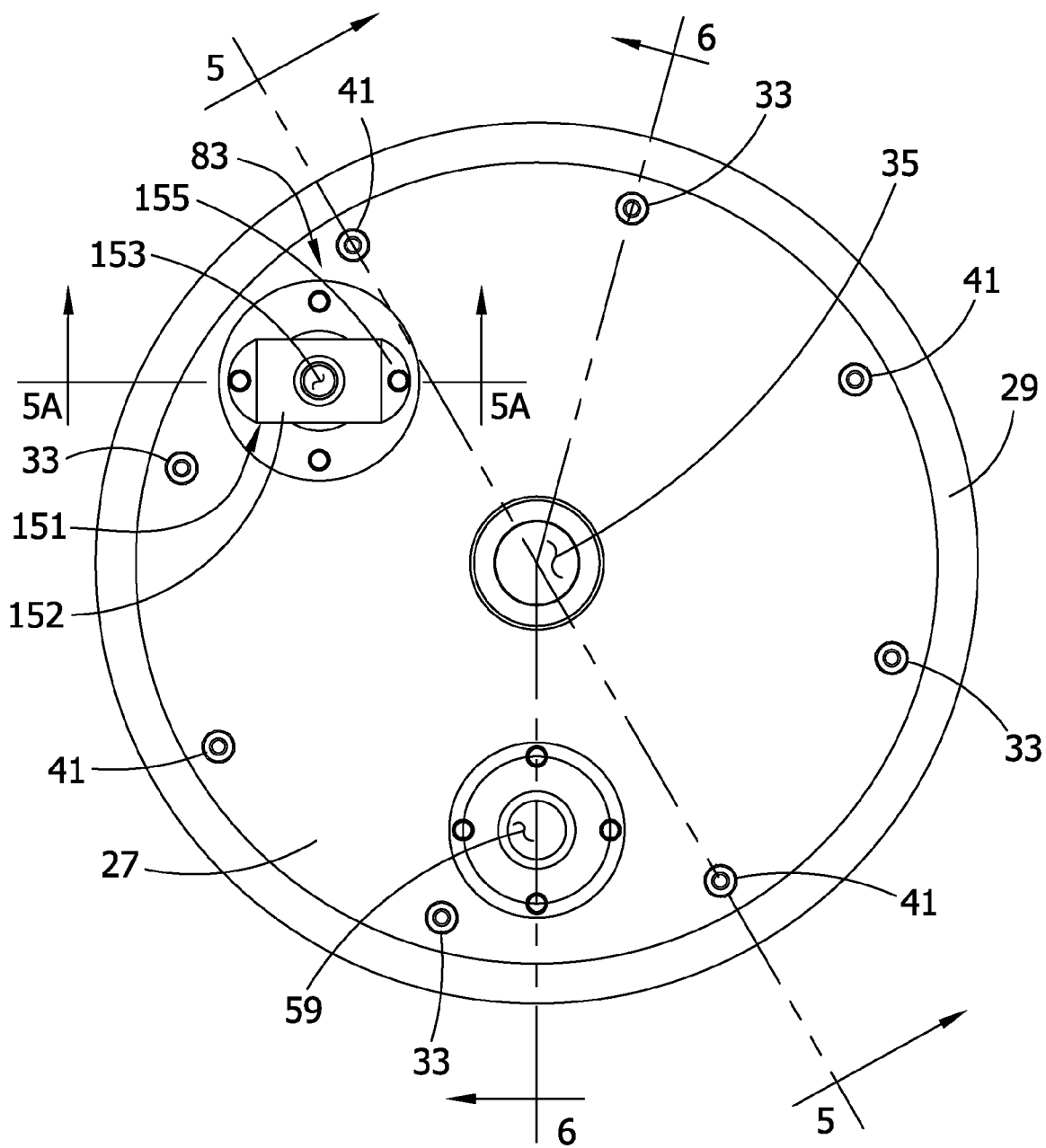
FIG. 4 is a top plan of a follower of the container system of FIG. 1.
Figure 5:
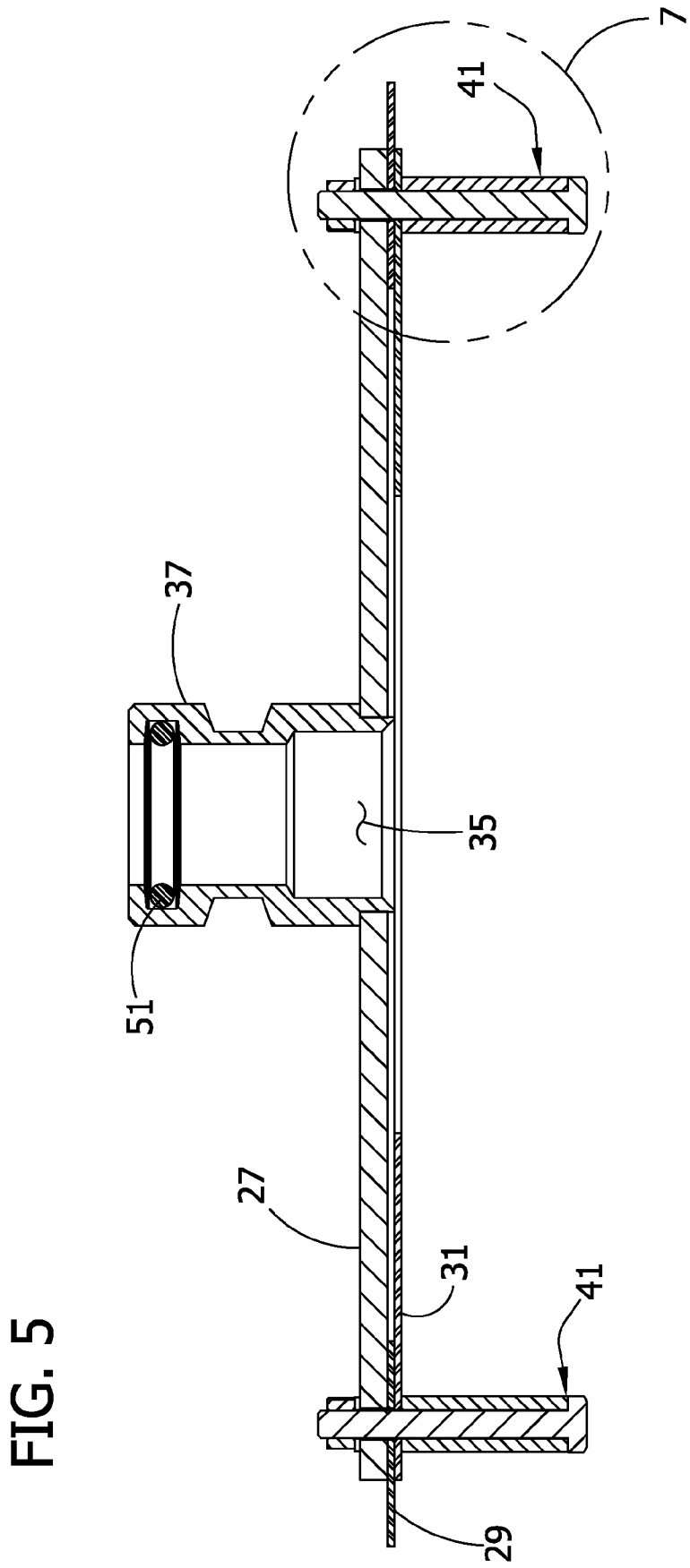
FIG. 5 is a section taken in the planes of lines 5-5 of FIG. 4.

As shown in FIG. 3, the follower 5 comprises a generally horizontal follower plate 27 configured to match the inside diameter and shape of the side wall 11 of the container 3, and an annular wiper seal 29 on the underside of the follower plate 27. The outer edge margins of the wiper seal 29 extend outward beyond the periphery of follower plate 27 and wipe against the side wall 11 of the container 3 to contain the viscous fluid in the volume of the container 3 below the follower 5. As best shown in FIG. 6, the wiper seal 29 is secured to the follower plate 27 by a retaining ring 31 fastened to the follower plate 27 by a number of fasteners 33. Referring to FIGS. 3 and 5, the follower plate 27 has a central opening 35. For reasons which will become apparent, a tubular sleeve 37 is attached to the upper face of the follower plate 27 above this opening 35. One or more stops 41 are attached to the follower plate 27 and extend down from the plate 27 for contact with the bottom wall 9 of the container 3 to prevent the follower 5 from contacting the inlet pipe 21. In the embodiment of FIG. 4, four such stops 41 are shown spaced at 90° intervals adjacent the periphery of the plate 27, but this number and spacing may vary.

Figure 2:
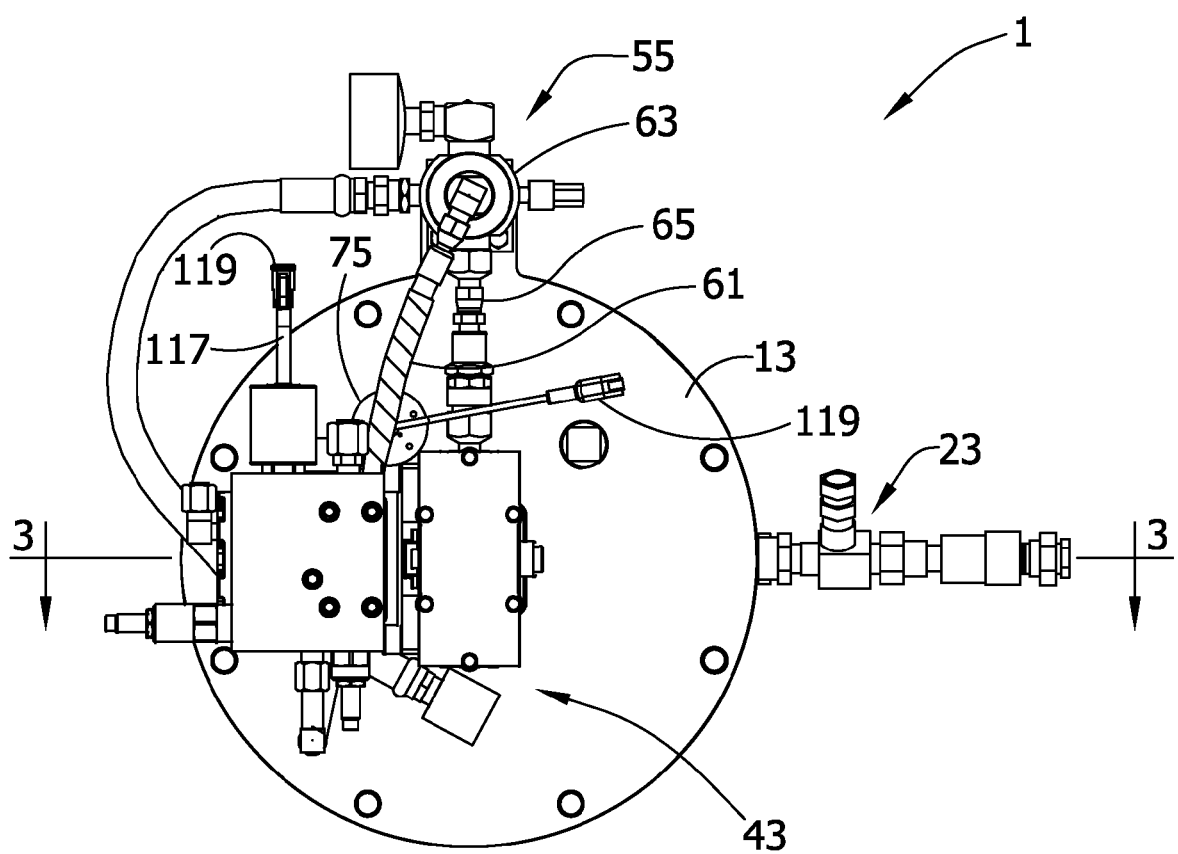
FIG. 2 is a top plan of the container system of FIG. 1.

Fluid is pumped from the container 3 by a pump, generally designated 43. In one configuration (FIGS. 1-3), the pump 43 is mounted on the container lid 13. By way of example, the pump 43 may be a FlowMaster® hydraulic pump sold by Lincoln Industrial Corporation of St. Louis, Mo. The pump 43 comprises a pump head 45 and a vertical pump tube 47 extending down from the head through an opening 49 in the lid 13 of the container 3, through the tubular sleeve 37 mounted on the follower 5, and through the opening 35 in the follower plate 27. An O-ring 51 inside the tubular sleeve 37 seals against the outside of the pump tube 47. The pump 43 is driven by a motor 53 which may be hydraulically, pneumatically or electrically operated. For further details regarding the construction and operation of the FlowMaster® pump, reference may be made to U.S. Pat. No. 6,364,639 incorporated herein by reference. Fluid is pumped from the container 3 to a suitable lubrication distribution system, generally designated 55, which delivers the lubricant to one or more points of lubrication. By way of example, the lubrication distribution system 55 may be a Centro-Matic® system, also sold by Lincoln Industrial Corporation and described in detail in U.S. Pat. No. 6,863,157 incorporated herein by reference. Other types of pumps, motors and distribution systems different from those described above can be used without departing from the scope of this invention. Further, while the pump 43 illustrated in the drawings is mounted on the lid 13 of the container 3, it will be understood that the pump 43 could be mounted at other locations, including a location off but adjacent the container 3 or a location remote from the container 3.

A vertical vent tube 57 is connected at its upper end to the lid 13 of the container 3 and extends down into the container 3 through a vent tube opening 59 in the follower plate 27. The upper end of the vent tube 57 is connected by a vent line 61 to a vent valve 63 in a lubricant feed line 65 connected to the outlet 67 of the pump tube 47. The vent valve 63 is controlled by a suitable controller of the lubrication distribution system 55 to vent the lubricant feed line 65, as described in the aforementioned U.S. Pat. No. 6,863,157.

Figure 5A:
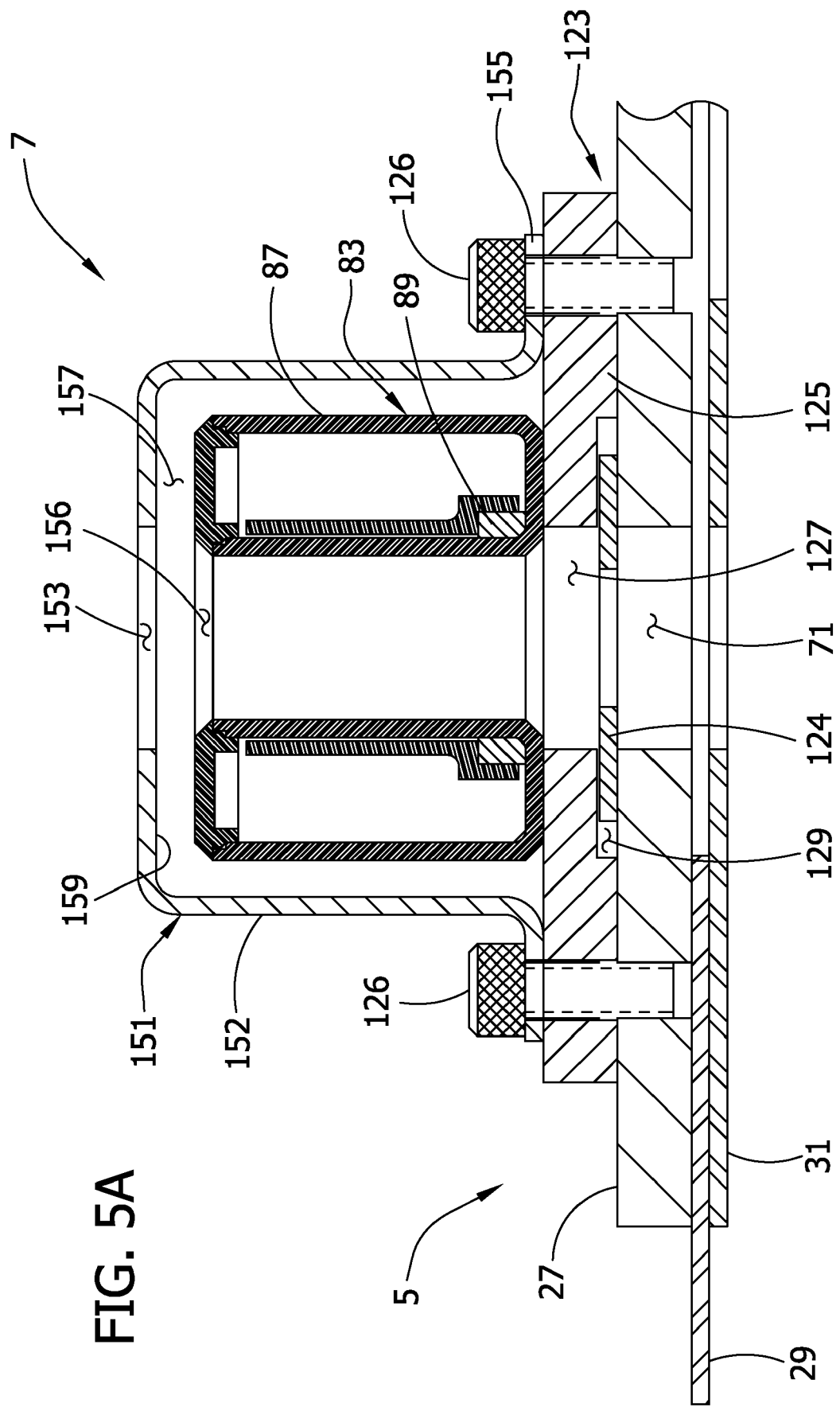
FIG. 5A is an enlarged portion of FIG. 5, showing the level sensor assembly and the follower.
Figure 7:
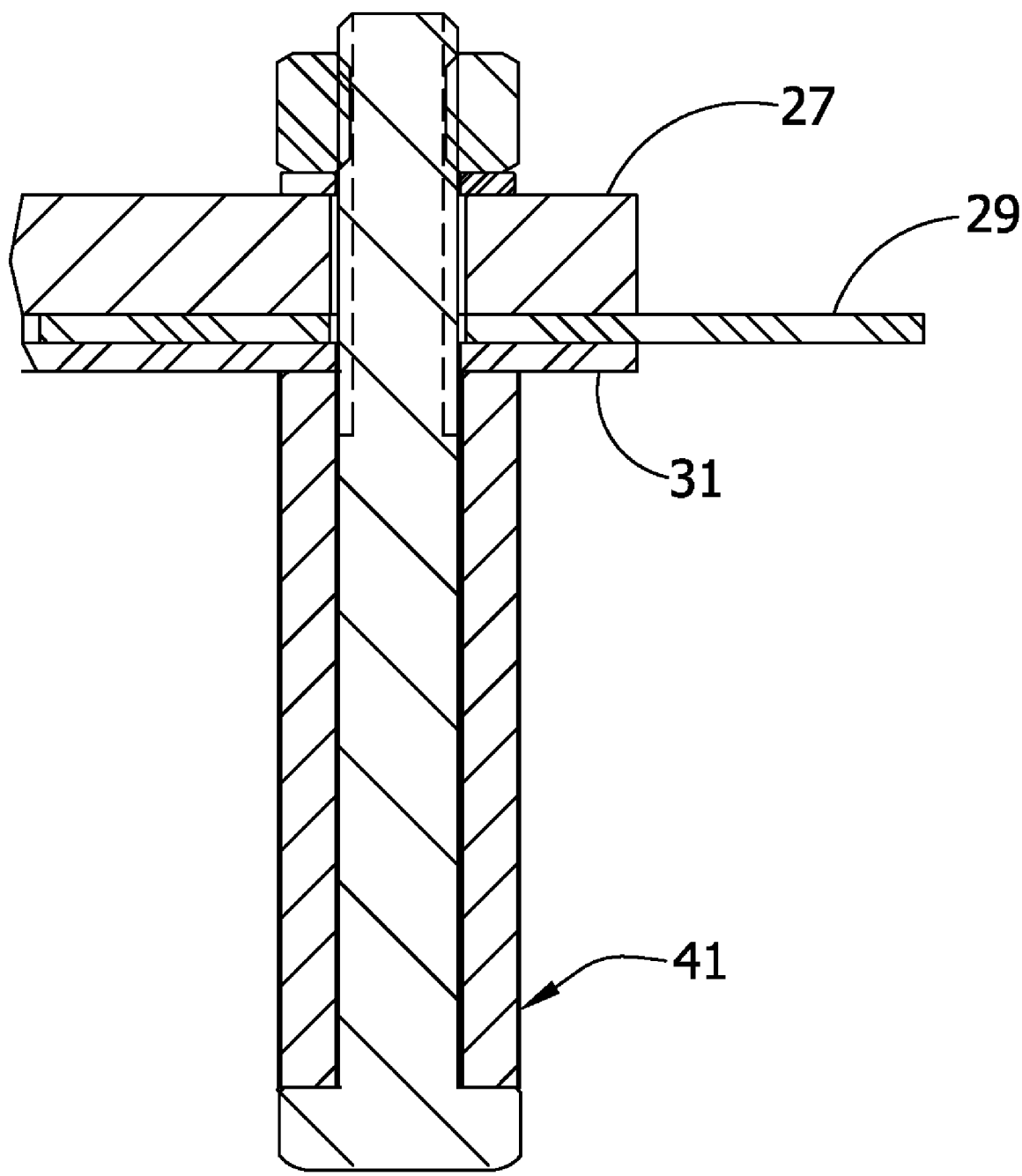
FIG. 7 is an enlarged portion of FIG. 5 showing a spacer (stopper) of the follower.

Referring to FIGS. 3 and 5A, the sensor assembly 7 comprises a guide 69 in the form of a vertical sensor tube 69 extending down from the lid 13 of the container 3 through a guide opening 71 in the follower 5. The bottom of the tube 69 is closed. The sensor tube 69 is attached at its upper end to the lid 13 by means of a mounting plate 75 fastened to the lid 13 on the upper face of the lid 13. The mounting plate 75 has a tubular extension 77 which projects down through an opening (not shown) in the lid 13 and receives the upper end of the sensor tube 69. A gasket 81 between the mounting plate 75 and the lid 13 seals the opening 79 in the lid 13. Illustrated in FIGS. 3, 8 and 8A, the sensor assembly 7 further comprises a first device 83 above the follower 5 movable up and down on the guide 69 in response to movement of the follower 5, and a second device 85 secured in fixed position adjacent the guide 69, the first 83 and second 85 devices cooperating on movement of the first device 83 past the second device 85 to signal a level of fluid in the container 3.

In the illustrated embodiment (FIGS. 3, 5A, 8 and 8A), the first device 83 comprises a hollow annular body 87 containing one or more magnets 89. The annular body 87 is of a material (e.g., plastic) which will not interfere with the operation of the magnet(s) 89 as described below. The annular body 87 is slidable on the guide 69 and moves as the follower 5 moves. Specifically, the annular body 87 moves upward with the follower 5 when the container 3 is filled with fluid, and the annular body 87 moves down under the force of gravity when the follower 5 descends as fluid is removed from the container 3.

Figure 8:
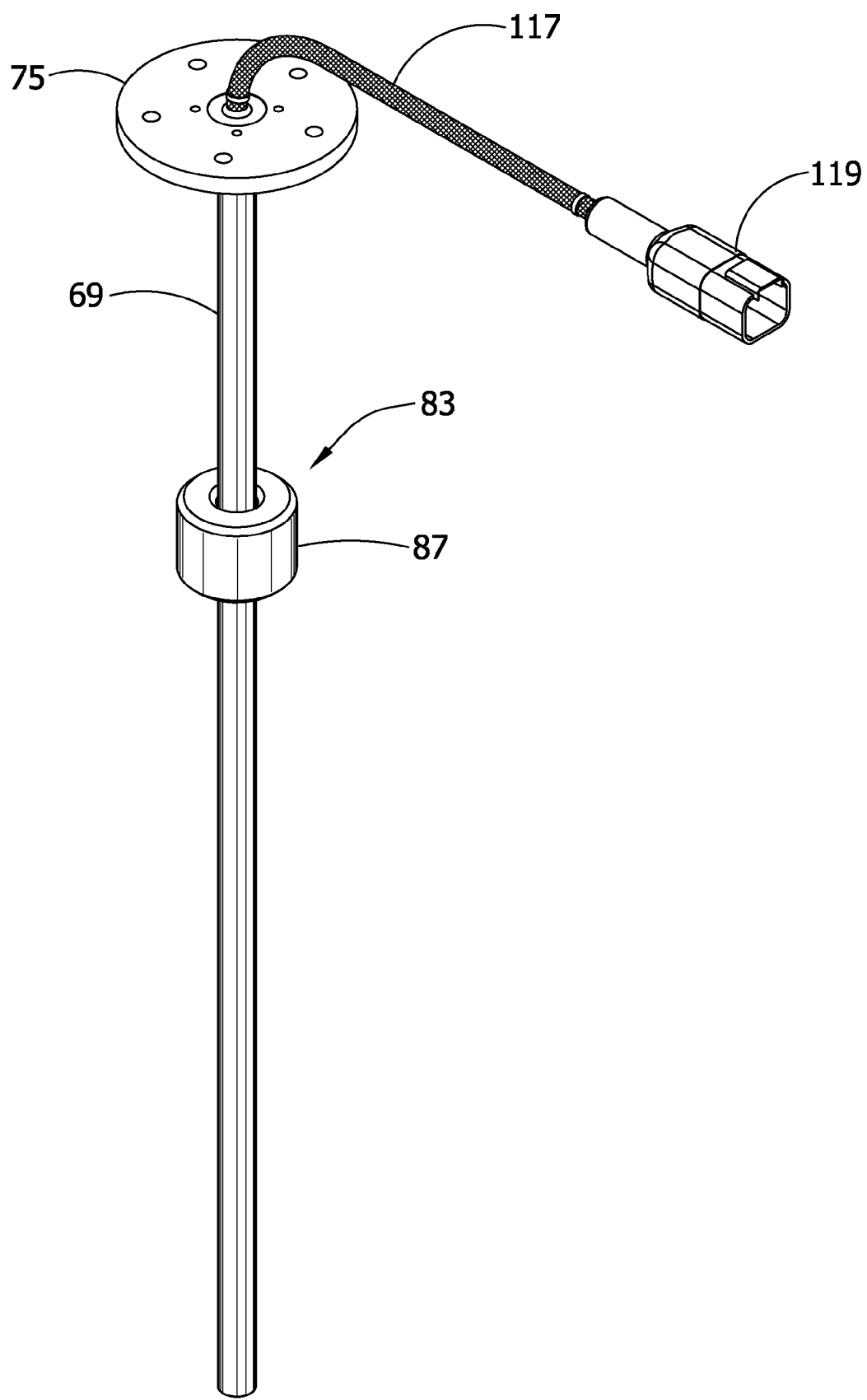
FIG. 8 is a perspective of one embodiment of a sensor assembly of this invention.
Figure 8A:
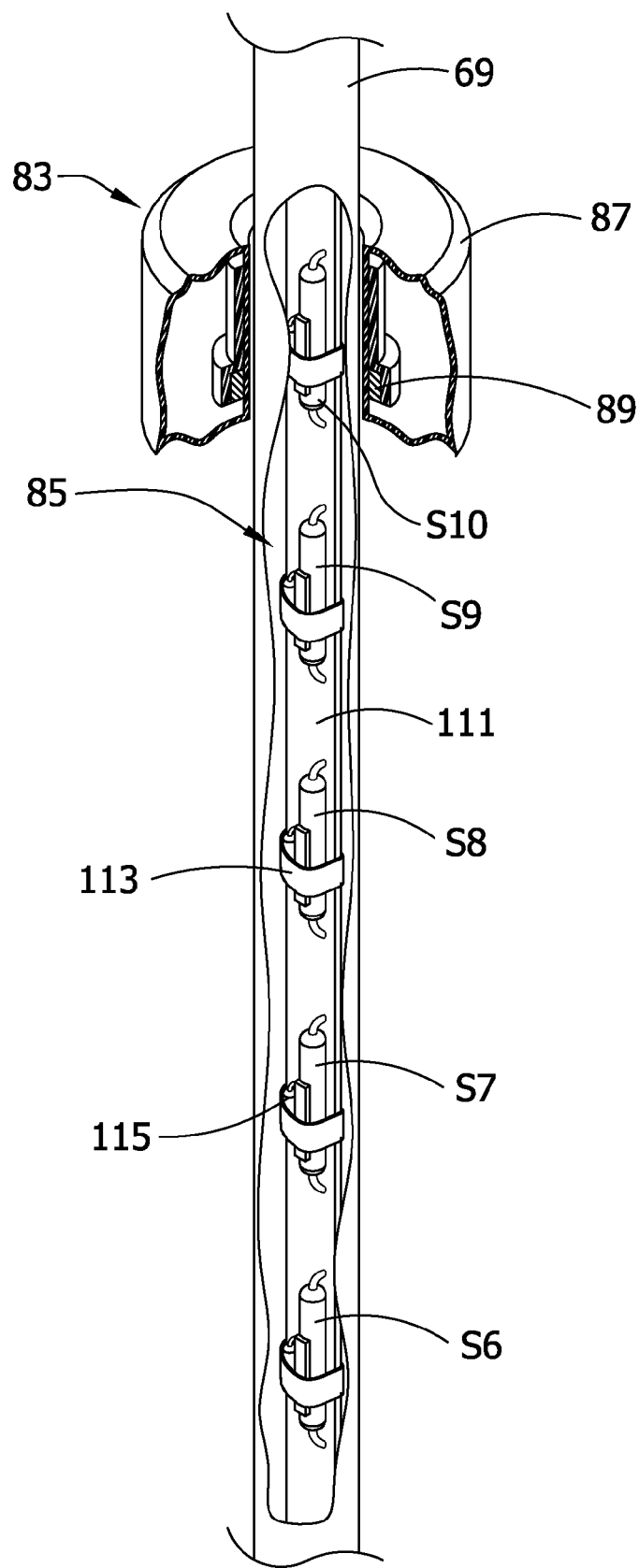
FIG. 8A is an enlarged portion of FIG. 8 with portions broken away to show components inside a sensor tube of the sensor assembly.
Figure 9:
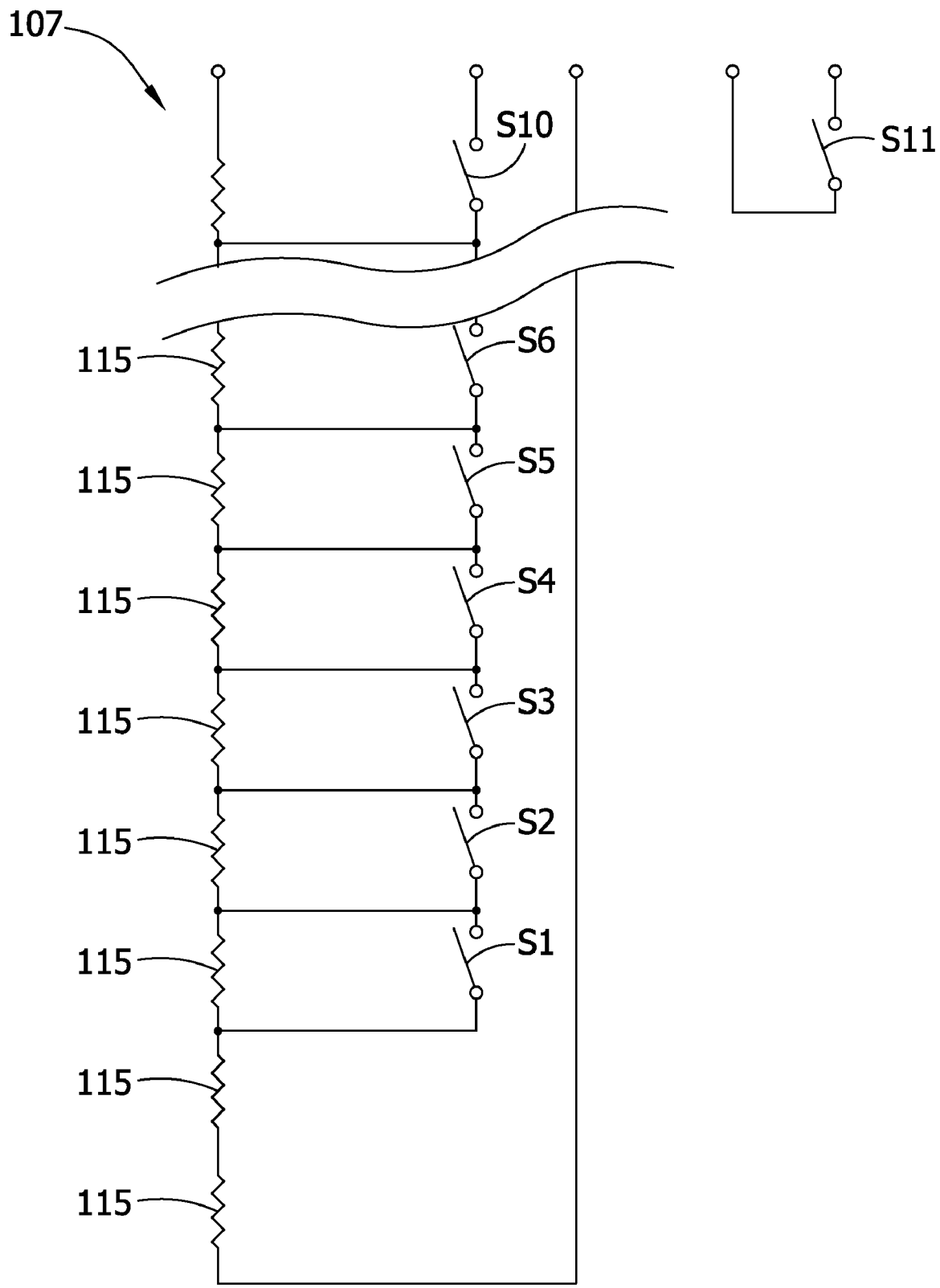
FIG. 9 is one embodiment of an electrical circuit of the sensor assembly.

Referring to FIGS. 8, 8A and 9, the second device 85 of the sensor assembly 7 comprises, in one embodiment, an electrical circuit 107 containing a plurality of vertically spaced, magnetically actuated switches S1-Sn adjacent the sensor tube 69, where n is a number of 2 or more. The switches S1-S10 and associated circuitry are preferably mounted on an elongate substrate 111 secured in a fixed position inside the tube 69, the tube 69 being of a material, e.g., brass, which will not interfere with the magnetic actuation of the switches S1-S10. In one embodiment (FIG. 8A), the switches S1-S10 are bi-stable Reed switches. Resilient bands 113 or other suitable means encircle the switches S1-S10 and the substrate 111 and have a relatively close clearance fit inside the sensor tube 69 to maintain the switches S1-S10 and substrate 111 in a substantially fixed radial position inside the tube 69.

An exemplary circuit is illustrated in FIG. 9. It contains ten switches S1-S10, spaced at vertical intervals corresponding to ten different levels L1-L10 of fluid in the container 3. Preferably, level L1 corresponds to a level where the container 3 is substantially empty and in need of refilling, and level L10 corresponds to a level where the container 3 is substantially full. The number of intervening levels can be varied as needed or desired. In one embodiment, for example, the switches S1-S10 may be vertically spaced at intervals of about 1.25 in. In one highly preferred embodiment, the spacing between the switches S1-S10 may correspond to the amount of fluid used during a specified interval of time (e.g., 24 hours). Illustrated in FIGS. 8A and 9, the circuit 107 also includes a number of resistors 115, e.g., one for each switch S1-S10, connected in series. These resistors 115 may be of any suitable resistance (e.g., alternating 20-ohm and 22-ohm resistors). In this particular embodiment (FIG. 3), the circuit 107 is designed such that when the container 3 is empty, the switches S1-S10 are in their normally open position and the overall resistance of the circuit 107 is at its maximum value (e.g., 243 ohms). During refilling, the follower 5 will rise, causing the annular body 87 containing the magnet(s) 89 to move upward on the sensor tube (guide) 69. As the body 87 moves past each switch S1-S10, the magnet(s) 89 will latch the switch S1-S10 to its closed position, causing the overall circuit resistance to decrease by an amount corresponding to the resistor 115 associated with the switch S1-S10, until the follower 5 and annular body 87 reach a level (height) in the container 3 where all of the switches S1-S10 are closed and the overall resistance of the circuit 107 is at a minimum value (e.g., 33 ohms), indicating that the container 3 is full. Refilling is then stopped. When the pump 43 is operated to remove fluid from the container 3, the fluid level will drop, causing the follower 5 and annular body 87 in the cage 151 to descend. As the magnet(s) 89 in the annular body 87 moves past each switch S1-S10, the switch S1-S10 latches to its open position, causing the overall circuit resistance to increase by an amount corresponding to the resistor 115 associated with the switch S1-S10. Thus, the resistance of the circuit 107 at any given time will indicate the level of fluid in the container 3.

Referring to FIG. 8, the circuit 107 described above is connected by wiring contained in a sheath 117 extending up through the mounting plate 75 to a connector 119 which can be used for electrically connecting the circuit 107 to a computer or other means capable of correlating the resistance of the circuit 107 to the corresponding level of fluid in the container 3, and then displaying and/or signaling the level of fluid. In this manner, the level of fluid in the container 3 can be monitored, and the fluid level at any given time can be immediately determined. As a result, refilling of the container 3 can be scheduled more efficiently, and the risk of running out of fluid when it is needed is minimized.

The annular body 87, sensor tube 69, circuitry 107, mounting plate 75 and connector 119 described above are commercially available from Elobau Sensor Technology, Inc.

It will be understood that first and second devices other than those described above may be used for accomplishing the intended result, i.e., sensing the level of fluid in the container. For example, different electrical circuits having a different number of switches and/or different resistors or other electrical components may be used. Alternatively, magnetostriction technology can be used in which a sonic strain pulse is induced in a specially designed waveguide by the momentary interaction of two magnetic fields. By way of example, one field can be induced by a permanent magnet in or on the annular body, for example, and the other field can be induced by an interrogation pulse from a pulse generator traveling along a waveguide in or on the sensor tube. The interaction of the two magnetic fields produces a strain pulse which travels back along the waveguide until the pulse is detected by a sensor head. The position of the magnet is determined by measuring the elapsed time between the generation of the interrogation pulse and the arrival of the resulting strain pulse at the sensor head. Other techniques may be used.

Referring to FIG. 3, optionally, the container system 1 may also include a device operable to send a signal in response to lubricant in the container 3 rising to a predetermined level during refilling of the container 3. In one embodiment (FIG. 9), this device comprises an additional magnetically operated switch S-11 positioned on the substrate 111 inside the sensor tube 69 at a level L-11 above L-10 for actuation by the magnet(s) 89 in the annular body 87 when the annular body 87 rises to a height or level in the container 3 indicating that further filling should cease immediately. The system 1 can be configured such that actuation of the switch S11 causes a visual and/or audible signal or alarm to be sent to an operator, or such that actuation of the switch S11 stops the operation of a pump being used to refill the container 3.

Referring to FIGS. 3 and 5A, the first seal assembly 123 comprises an assembly seal 124 surrounding the guide (sensor tube) 69 for sealing the guide (sensor tube) opening 71 in the follower 5 and a seal housing 125. The seal 124 is movable in a generally horizontal plane relative to the follower plate 27 to prevent binding of the guide 69 in the guide opening 71 as the follower 5 moves in the container 3. (Binding could otherwise occur if, for example, the pump tube 47, guide tube 69 and/or vent tube 57 are either not parallel to one another or not at right angles to the follower plate 27.) In the embodiment of FIGS. 3 and 5A, the first seal assembly 123 includes a seal housing 125 secured to the top face of the follower plate 27 by fasteners 126. The seal housing 125 has an opening 127 in it generally aligned with the guide opening 71 in the follower plate 27. The underside of the housing 125 is formed with a recess 129 which receives the seal 124. The recess 129 is sized to have a horizontal dimension larger than the corresponding horizontal dimension of the seal 124 to permit movement of the seal 124 in a generally horizontal plane. The housing 125 is preferably fabricated from aluminum or other non-magnetic material capable of insulating or shielding the follower plate 27, which is typically fabricated from steel or other magnetic material, from the magnet(s) 89 in the annular body 87. In this manner, magnetic interference between the magnet(s) 89 and the follower plate 27 is avoided. The seal 124 can be of an appropriate flexible sealing material (e.g., rubber) or a more rigid elastomer (e.g., a fluorocarbon). The thickness of the seal 124 relative to the height of the recess 129 should be such as to allow horizontal movement of the seal in the recess while preventing leakage of lubricant past the seal 124, a close clearance sealing fit being sufficient in most cases. Lubricant in the container 3 will reduce the friction caused by any movement of the seal 124 relative to the follower plate 27 and/or housing 125 to prevent binding of the guide 69 in the guide opening 71.

Referring to FIGS. 3 and 6, the second seal assembly, generally designated 131, similar to the first sealing assembly 123 described above, is for preventing binding of the vent tube 57 in the vent tube opening 59 in the follower plate 27. The second seal 131 assembly comprises a seal 124 surrounding the vent tube 57 and a seal housing 125 secured by fasteners to the top face of the follower plate 27. The seal housing 125 has an opening 127 in it generally aligned with the vent tube opening 59 in the follower plate 27. The underside of the housing 125 is formed with a recess 129 which receives the seal 124. The recess 129 is sized to have a horizontal dimension larger than the corresponding horizontal dimension of the seal 124 to permit movement of the seal 124 in a generally horizontal plane. The seal 124 can be of an appropriate flexible sealing material, as described above. The thickness of the seal 124 relative to the height of the recess 129 should be such as to allow horizontal movement of the seal in the recess while preventing leakage of lubricant past the seal 124, a close clearance sealing fit being sufficient in most cases. Lubricant in the container 3 will reduce the friction caused by any movement of the seal 124 relative to the follower plate 27 and/or housing 125 to prevent binding of the vent tube 57 in the vent tube opening 59.

As shown in FIGS. 3-5, a limit device, generally designated 151 on the follower 5 limits separation of the annular body 87 away from the follower 5 when the follower 5 descends, as might otherwise occur in a situation where material (e.g., viscous fluid) on the annular body 87 and/or the outside of the sensor tube 69 prevents or inhibits downward movement of the annular body 87 on the guide 69 under the mere force of gravity. In one embodiment, the limit device 151 comprises a cage 152 in the form of inverted-U shaped member having opposite sides, a top with an opening 153 in it for receiving the sensor tube 69, and flanges 155 at the lower ends of the sides attached (as by fasteners 126) to the seal housing 125 of the first seal assembly 123. The annular body 87 is disposed in the cage 152, with the opening 156 in the annular body 87 vertically aligned with the opening 153 in the top of the cage 152 and the guide opening 71 in the follower 5. As best illustrated in FIG. 5A, a small clearance 157 is provided between the top of the annular body 87 and the top of the cage 152. If the annular body 87 becomes hung up on the guide 69 when the follower 5 descends, the wall 159 of the cage 152 will contact the annular body 87 and force the annular body 87 down to prevent substantial further upward separation of the annular body 87 from the follower 5. As a result, the vertical position of the annular body 87 relative to the follower 5 remains substantially fixed during downward movement of the follower 5 in the container 3. The magnitude of the vertical clearance 157 between the annular body 87 and the top of the cage 152 (or other limit device 151) can vary from zero to an inch or more, and even more desirably from zero to about 0.125 in, the precise dimension of the clearance 157 not being critical so long as it is not so large as to interfere with the proper sensing function of the sensor assembly 7. The cage 152 can have other configurations so long as it limits the upward movement of the annular body 87 relative to the follower 5 as the follower 5 descends in the container 3.

The container system 1, level sensor assembly 7, sealing assemblies 123, 131 and other aspects of this invention are particularly suited for use with viscous fluids. (As used herein, the term "viscous" means a fluid having a viscosity of at least 20,000 centipoise, and preferably at least 30,000 centipoise, and even more preferably at least 40,000 centipoise or more, e.g., at least 50,000 or 60,000 or 70,000 centipoise.) However, it is contemplated that the various features of this invention may also be useful for other less viscous fluids.

It is contemplated that the first device 83, limit device 151, and first seal assembly 123 can be positioned below the follower 5 rather than above the follower 5 as depicted in FIGS. 3, 5, and 5A. The second seal assembly 131 can also be positioned below the follower 5.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A container system, comprising:
   a container for holding a viscous fluid;
   a vertical pump tube in the container;
   a generally horizontal follower plate in the container having a first opening receiving the pump tube, said follower plate being adapted to rest on the fluid in the container and to move up and down in the container in response to a change in a level of fluid in the container; and
   a sensor assembly for sensing the level of fluid in the container,
   said sensor assembly comprising:
      a vertical guide in the container extending generally parallel to the pump tube through a second opening in the follower plate spaced from the first opening in the follower plate;
      a first device movable up and down on the guide in response to movement of the follower plate;
      a second device secured in fixed position adjacent the guide;
      said first and second devices cooperating on movement of the first device past the second device to signal a level of fluid in the container; and
   a limit device attached to the follower plate for engaging the first device to limit separation of the first device in a vertical direction away from the follower plate when the follower plate moves in the container whereby viscous fluid on said guide or said first device does not prevent movement of the first device on the guide as the follower moves in the container.

2. A system as set forth in claim 1 wherein said follower plate has a wiper seal around its periphery for wiping against a side wall of the container.

3. A system as set forth in claim 2 wherein said limit device comprises a cage attached to said follower plate and extending over the first device to limit separation of the first device upward away from the follower plate.

4. A system as set forth in claim 1 wherein said first device comprises a switch actuator enclosed in a body movable independent of said follower plate and said second device comprises a series of switches at different heights in said container.

5. A system as set forth in claim 4 wherein said guide comprises a generally vertical tube, and wherein said switches are disposed inside the tube.

6. A system as set forth in claim 1 further comprising a third device operable to send a signal in response to fluid in the container rising to a predetermined level during refilling of the container.

7. A system as set forth in claim 6 wherein said third device is a switch in the container adapted to be actuated by movement of the follower plate.

8. A system as set forth in claim 1 further comprising a first seal assembly comprising a seal surrounding said guide for sealing the guide opening in the follower plate, said seal being movable in a generally horizontal plane relative to the follower plate to prevent binding of the guide in the guide opening as the follower plate moves in the container.

9. A system as set forth in claim 8 wherein said first seal assembly further comprises a seal housing attached to said follower plate, an opening in the seal housing generally aligned with the guide opening in the follower plate, and a recess defined at least in part by said seal housing for receiving said seal therein, said recess being sized larger than said seal to permit movement of the seal in said generally horizontal plane.

10. A container system, comprising:
a container for holding a viscous fluid;
a follower in the container having a pump tube opening for receiving a pump tube in the container, said follower being adapted to move up and down in the container in response to a change in a level of fluid in the container; and
a sensor assembly for sensing the level of fluid in the container,
said sensor assembly comprising:
  a guide adapted to extend down into the container through a guide opening in the follower spaced from the pump tube opening;
  a first device movable up and down on the guide in response to movement of the follower;
  a second device secured in fixed position adjacent the guide;
  said first and second devices cooperating on movement of the first device past the second device to signal a level of fluid in the container; and
a limit device attached to the follower for limiting separation of the first device away from the follower when the follower moves in the container whereby viscous fluid on said guide or said first device does not prevent movement of the first device on the guide as the follower moves in the container;
a first seal assembly comprising a seal surrounding said guide for sealing the guide opening in the follower, said seal being movable in a generally horizontal plane relative to the follower to prevent binding of the guide in the guide opening as the follower moves in the container;
a vertical vent tube in the container extending through a vent tube opening in the follower spaced from the pump tube opening, and
a second seal assembly comprising a seal surrounding the vent tube for sealing the vent tube opening, said seal of the second seal assembly being movable in a generally horizontal plane relative to said follower to prevent binding of the vent tube in the vent tube opening as the follower moves in the container.

11. A container system, comprising:
a container for holding a viscous fluid;
a follower in the container having a first opening for receiving a vertical pump tube, said follower being adapted to move up and down in the container in response to a change in a level of fluid in the container;
said follower having a wiper seal around its periphery for wiping against a side wall of the container;
a sensor assembly for sensing the level of fluid in the container;
said sensor assembly comprising:
  a guide adapted to extend down into the container through a second opening in the follower spaced from said first opening in the follower;
  a first device movable up and down on the guide in response to movement of the follower;
  a second device secured in fixed position adjacent the guide;
  said first and second devices cooperating on movement of the first device past the second device to signal a level of fluid in the container;
a limit device attached to the follower for limiting separation of the first device in a vertical direction away from the follower when the follower moves in the container whereby viscous fluid on said guide or said first device does not prevent movement of the first device on the guide as the follower moves in the container;
a pump mounted atop the container; and
a vertical pump tube extending down into the container through said first opening in the follower.

12. A system as set forth in claim 1 wherein said container contains a viscous fluid comprising grease having a viscosity of at least 60,000 centipoise.

13. A system set forth in claim 1 wherein said container comprises a lid, and wherein said guide is attached to the lid.

14. A level sensor assembly for a container adapted to hold a viscous fluid therein, said sensor assembly comprising:
  a follower plate having a first opening for receiving a vertical pump tube in the container, said follower plate being adapted to rest on fluid in the container for movement in the container in response to a change of fluid level;
  said follower plate having a wiper seal around its periphery for wiping against a side wall of the container;
  a guide adapted to be attached to a lid of the container and to extend into the container through a second opening in the follower plate spaced from the first opening;
  a first device adapted to move on the guide in response to movement of the follower plate;
  a second device adapted to be secured in fixed position adjacent the guide;
  said first and second devices being adapted to cooperate on movement of the first device past the second device to signal a level of fluid in the container; and
  a limit device attached to the follower plate for limiting separation of the first device in a vertical direction away from the follower plate when the follower plate moves in the container whereby viscous fluid on said guide or said first device does not prevent movement of the first device on the guide as the follower moves in the container.

15. An assembly as set forth in claim 14 wherein said limit device is a cage attached to said follower plate and extending over said first device.

16. An assembly as set forth in claim 14 wherein said first device comprises a switch actuator enclosed in a body movable independent of said follower plate and said second device comprises at least one switch operable in response to movement of said switch actuator.

17. An assembly as set forth in claim 16 wherein said switch actuator comprises a magnet and said second device comprises a series of magnetically actuated switches adapted to be mounted at different heights in said container.

18. A pump and level sensor assembly for a container adapted to hold a viscous fluid therein, said sensor assembly comprising:
  a pump adapted to be mounted atop the container, said pump comprising vertical pump tube adapted to extend vertically in the container;
  a follower adapted to be placed in the container having a first opening receiving the pump tube, said follower being adapted for movement in the container in response to a change of fluid level;
  a guide adapted to be attached to a lid of the container and to extend into the container through a second opening in the follower spaced from the first opening;
  a first device adapted to move on the guide in response to movement of the follower;
  a second device adapted to be secured in fixed position adjacent the guide;
  said first and second devices being adapted to cooperate on movement of the first device past the second device to signal a level of fluid in the container; and
  a limit device attached to the follower for limiting separation of the first device in a vertical direction away from the follower when the follower moves in the container whereby viscous fluid on said guide or said first device does not prevent movement of the first device on the guide as the follower moves in the container.

19. A container system, comprising:
a container for holding a viscous fluid;
a follower in the container adapted to move up and down in the container in response to a change in a level of fluid in the container, said follower having a wiper seal around its periphery for wiping against a side wall of the container;
a first vertical member in the container extending through a first opening in the follower; and
a first seal assembly comprising a seal surrounding the first vertical member for sealing the first opening in the follower, said seal being movable in a generally horizontal plane relative to said follower upon engagement by said first vertical member thereby to prevent binding of the first vertical member in the first opening as the follower moves in the container.

20. A system as set forth in claim 19 wherein said first seal assembly further comprises a seal housing attached to said follower, an opening in the seal housing generally aligned with said first opening in the follower for receiving said first vertical member, and a recess defined at least in part by said seal housing for receiving said seal therein, said recess being sized larger than said seal to permit movement of the seal in said generally horizontal plane.

21. A container system, comprising:
a container for holding a viscous fluid;
a follower in the container adapted to move up and down in the container in response to a change in a level of fluid in the container;
a first vertical member in the container extending through a first opening in the follower;
a first seal assembly comprising a seal surrounding the first vertical member for sealing the first opening in the follower, said seal being movable in a generally horizontal plane relative to said follower to prevent binding of the first vertical member in the first opening as the follower moves in the container;
a second vertical member in the container extending through a second opening in the follower, and
a second seal assembly comprising a seal surrounding the second vertical member for sealing the second opening in the follower, said seal of the second seal assembly being movable in a generally horizontal plane relative to said follower to prevent binding of the second vertical member in the second opening as the follower moves in the container.

22. A container system, comprising:
a container for holding a viscous fluid;
a follower in the container adapted to move up and down in the container in response to a change in a level of fluid in the container;
a first vertical member in the container extending through a first opening in the follower;
a first seal assembly comprising a seal surrounding the first vertical member for sealing the first opening in the follower, said seal being movable in a generally horizontal plane relative to said follower to prevent binding of the first vertical member in the first opening as the follower moves in the container; and
a pump mounted atop the container, said pump comprising a vertical pump tube extending down into the container through an opening in the follower.

23. A system as set forth in claim 19 wherein said container contains a viscous fluid comprising grease having a viscosity of at least 60,000 centipoise, and further comprising an annular seal on said follower for wiping against an inside wall of the container.

24. A level sensor assembly for a container adapted to hold a viscous fluid therein, said sensor assembly comprising:
a follower having a first opening for receiving a vertical pump tube in the container, said follower being adapted to be placed in the container and to rest on fluid in the container for movement up and down in the container in response to a change of fluid level;
said follower having a wiper seal around its periphery for wiping against a side wall of the container;
a guide adapted to extend down into the container through a second opening in the follower spaced from the first opening;
a first device comprising a body slidable on the guide in response to movement of the follower in the container, said body containing one or more switch actuators;
a second device comprising a plurality of switches secured in fixed position adjacent the guide;
said first and second devices being adapted to cooperate on movement of the first device past the second device to signal a level of fluid in the container; and
a limit device attached to the follower for limiting separation of said body and said switch actuators in a vertical direction away from the follower when the follower moves in the container whereby viscous fluid on said guide or said first device does not prevent movement of the first device on the guide as the follower moves in the container.

25. A container system, comprising:
a container containing a viscous fluid having a viscosity of at least 60,000 centipoise;
a vertical pump tube in the container;
a follower in the container having a first opening receiving the pump tube, said follower being adapted to move up and down in the container in response to a change in a level of the viscous fluid in the container; and
a sensor assembly for sensing the level of fluid in the container;
said sensor assembly comprising:
a guide adapted to extend down into the container through a second opening in the follower spaced from the first opening;
a first device movable up and down on the guide in response to movement of the follower;
a second device secured in fixed position adjacent the guide;
said first and second devices cooperating on movement of the first device past the second device to signal a level of fluid in the container; and
a limit device attached to the follower for limiting separation of the first device away from the follower when the follower moves in the container whereby viscous fluid on said guide or said first device does not prevent movement of the first device on the guide as the follower moves in the container.

26. A container system as set forth in claim 25 wherein said follower comprises a follower plate and a wiper seal around a periphery of the follower plate for wiping against a side wall of the container.

27. A container system for grease, comprising:
a container for holding a viscous grease, said container having a lid;
a vertical pump tube in the container;

a follower plate in the container having a first opening receiving the pump tube, said follower plate being adapted to move up and down in the container in response to a change in a level of the grease in the container;

said follower plate having a wiper seal around its periphery for wiping against a side wall of the container;

a sensor assembly for sensing the level of grease in the container;

said sensor assembly comprising:

a guide attached to the lid of the container and extending down into the container through a second opening in the follower plate spaced from the first opening;

a switch-actuating device movable up and down on the guide in response to movement of the follower plate;

a switch device secured in fixed position adjacent the guide;

said switch-actuating device and said switch device cooperating on movement of the switch-actuating device past the switch device to signal a level of grease in the container;

a limit device attached to the follower plate for limiting separation of the switch-actuating device away from the follower plate when the follower plate moves in the container whereby grease on the guide or the switch-actuating device does not prevent movement of the switch-actuating device on the guide as the follower plate moves in the container; and a first seal assembly comprising a seal surrounding said guide for sealing the guide opening in the follower plate, said seal being movable in a generally horizontal plane relative to the follower plate to prevent binding of the guide in the first opening as the follower plate moves in the container.

* * * * *